United States Patent
Jeong et al.

(10) Patent No.: US 12,309,882 B2
(45) Date of Patent: May 20, 2025

(54) SERVICE PROVIDING METHOD AND DEVICE USING PLURALITY OF SIMs

(71) Applicant: Samsung Electronics Co., Ltd., Gyeonggi-do (KR)

(72) Inventors: Sangsoo Jeong, Gyeonggi-do (KR); Hoyeon Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 228 days.

(21) Appl. No.: 17/635,944

(22) PCT Filed: Aug. 14, 2020

(86) PCT No.: PCT/KR2020/095111
§ 371 (c)(1),
(2) Date: Feb. 16, 2022

(87) PCT Pub. No.: WO2021/034175
PCT Pub. Date: Feb. 25, 2021

(65) Prior Publication Data
US 2022/0295265 A1    Sep. 15, 2022

(30) Foreign Application Priority Data
Aug. 16, 2019    (KR) .......................... 10-2019-0100631

(51) Int. Cl.
*H04W 8/20* (2009.01)
*H04L 65/1016* (2022.01)
*H04W 68/00* (2009.01)

(52) U.S. Cl.
CPC ........... *H04W 8/20* (2013.01); *H04L 65/1016* (2013.01); *H04W 68/005* (2013.01)

(58) Field of Classification Search
CPC ..... H04W 8/20; H04W 8/183; H04W 68/005; H04W 12/37; H04W 12/45; H04W 60/005; H04W 88/06; H04L 65/1016
(Continued)

(56) References Cited

U.S. PATENT DOCUMENTS

| 8,862,127 B2 | 10/2014 | Shin |
| 9,307,512 B2 | 4/2016 | Nayak et al. |

(Continued)

FOREIGN PATENT DOCUMENTS

| JP | 2020-505871 | 2/2020 |
| KR | 10-2015-0026982 | 3/2015 |

(Continued)

OTHER PUBLICATIONS

3GPP TS 24.501 V16.1.0, 3GPP, 3rd Generation Partnership Project; Technical Specification Group Core Network and Terminals; Non-Access Stratum (NAS) Protocol for 5G System (5GS); Stage 3 (Release 16), Jun. 2019, 541 pages.

(Continued)

*Primary Examiner* — Candal Elpenord
(74) *Attorney, Agent, or Firm* — The Farrell Law Firm, P.C.

(57) ABSTRACT

An operation method of a first network entity in a wireless communication system, includes: receiving, from a terminal, a registration request message regarding a plurality of subscriber identity modules (SIMs); performing a procedure for registering the plurality of SIMs, based on the registration request message; determining priorities between at least one registered SIM; and transmitting, to the terminal, a registration accept message including information about the priorities.

20 Claims, 11 Drawing Sheets

(58) Field of Classification Search
USPC .................................................. 370/329–330
See application file for complete search history.

(56) References Cited

U.S. PATENT DOCUMENTS

| | | | |
|---|---|---|---|
| 9,622,129 | B2 | 4/2017 | Kim et al. |
| 11,375,470 | B2 | 6/2022 | Zhu et al. |
| 2015/0065132 | A1 | 3/2015 | Ramkumar et al. |
| 2015/0245309 | A1* | 8/2015 | Nayak .................. H04W 8/183 |
| | | | 455/435.3 |
| 2019/0223132 | A1 | 7/2019 | Miao et al. |
| 2021/0022111 | A1* | 1/2021 | Kumar .............. H04W 52/0216 |
| 2022/0240213 | A1* | 7/2022 | Ly .......................... H04W 48/18 |
| 2022/0240222 | A1* | 7/2022 | Youn ...................... H04W 68/02 |
| 2022/0303934 | A1* | 9/2022 | Ianev ..................... H04W 8/183 |
| 2022/0330202 | A1 | 10/2022 | Kumar et al. |

FOREIGN PATENT DOCUMENTS

| | | |
|---|---|---|
| KR | 10-1593591 | 2/2016 |
| WO | WO 2013/187672 | 12/2013 |
| WO | WO 2015/157111 | 10/2015 |
| WO | WO 2015/0180138 | 12/2015 |
| WO | WO 2016/0118248 | 7/2016 |
| WO | WO 2018/141148 | 8/2018 |

OTHER PUBLICATIONS

LG Electronics, "Corrections to Emergency MUSIM", S1-192018, 3GPP TSG-SA WG1 Meeting #87, Aug. 19-23, 2019, 6 pages.

European Search Report dated Aug. 29, 2022 issued in counterpart application No. 20855193.7-1216, 11 pages.

International Search Report dated Nov. 11, 2020 issued in counterpart application No. PCT/KR2020/095111, 5 pages.

Written Opinion dated Nov. 11, 2020 issued in counterpart application No. PCT/KR2020/095111, 8 pages.

Intel, Qualcomm, 3GPP TSG-SA WG1 Meeting #86, S1-191292, Suzhou, China, May 13, 2019, "USE Case X: Support for Terminal with One or Multiple USIMs", pp. 3.

Intel Corporation, "Motivation for RAN Level Multi-SIM Support", RP-191347, 3GPP TSG RAN #84, Jun. 3-6, 2019, 7 pages.

Intel, "Service Requirements for Enabling Multi-USIM Devices Support", S1-190113, 3GPP TSG-SA WG1 Meeting #85, Feb. 18-22, 2019, 5 pages.

Japanese Office Action dated Jul. 8, 2024 issued in counterpart application No. 2022-510215, 22 pages.

Chinese Office Action dated Mar. 22, 2024 issued in counterpart application No. 202080064956.1, 17 pages.

JP Notice of Allowance dated Mar. 25, 2025 issued in counterpart application No. 2022-510215, 4 pages.

Korean Office Action dated Mar. 20, 2025 issued in counterpart application No. 10-2019-0100631, 6 pages.

* cited by examiner

SERVICE PROVIDING METHOD AND DEVICE USING PLURALITY OF SIMs

PRIORITY

This application is a National Phase Entry of PCT International Application No. PCT/KR2020/095111, which was filed on Aug. 14, 2020, and claims priority to Korean Patent Application No. 10-2019-0100631, which was filed on Aug. 16, 2019, the entire content of each of which is incorporated herein by reference.

TECHNICAL FIELD

The present disclosure generally relates to a wireless communication system, and relates to a method and apparatus for providing a service by using a plurality of subscriber identity modules (SIMs). More particularly, the present disclosure relates to a method and apparatus for effectively supporting a communication service, when one terminal uses a plurality of pieces of subscription information in a wireless communication system.

BACKGROUND ART

To meet the increase in demand with respect to wireless data traffic after the commercialization of $4^{th}$ generation (4G) communication systems, considerable efforts have been made to develop pre-$5^{th}$ generation (5G) communication systems or 5G communication systems. This is one reason why 5G communication systems or pre-5G communication systems are called beyond 4G network communication systems or post long-term evolution (LTE) systems. In order to achieve a high data rate, 5G communication systems are being developed to be implemented in an ultra-high frequency band (millimeter wave (mmWave)), e.g., a band of 60 GHz. In order to reduce a path loss of radio waves in such a super-high frequency band and to increase a transmission distance of radio waves in 5G communication systems, various technologies have been discussed and are being studied, for example: beamforming, massive multiple-input multiple-output (MIMO), full dimensional MIMO (FD-MIMO), array antennas, analog beam-forming, and large-scale antennas. In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation. Also, for 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA) and sparse code multiple access (SCMA), which are advanced access schemes.

The Internet has evolved from a human-based connection network, where humans create and consume information, to the Internet of things (IoT), where distributed components, such as objects, exchange information with each other to process the information. Internet of everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine to machine (M2M) communication, machine type communication (MTC), etc. have been studied. In the IoT environment, intelligent Internet technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of a cloud radio access network (RAN) as a big data processing technology as described above may be an example of convergence of 5G communication technology and IoT technology.

As described above, various services may be provided due to the development of wireless communication systems, and thus, methods of seamlessly providing such services are required.

DESCRIPTION OF EMBODIMENTS

Technical Problem

Embodiments are for providing an apparatus and method for effectively providing a service in a wireless communication system.

Solution to Problem

An operation method of a first network entity in a wireless communication system, according to an embodiment of the present disclosure, may include: receiving, from a terminal, a registration request message regarding a plurality of subscriber identity modules (SIMs); performing a procedure for registering the plurality of SIMs, based on the registration request message; determining priorities between at least one registered SIM; and transmitting, to the terminal, a registration accept message including information about the priorities.

Advantageous Effects of Disclosure

Embodiments are for providing an apparatus and method for effectively supporting a service in a wireless communication system.

MODE OF DISCLOSURE

Figure 1:
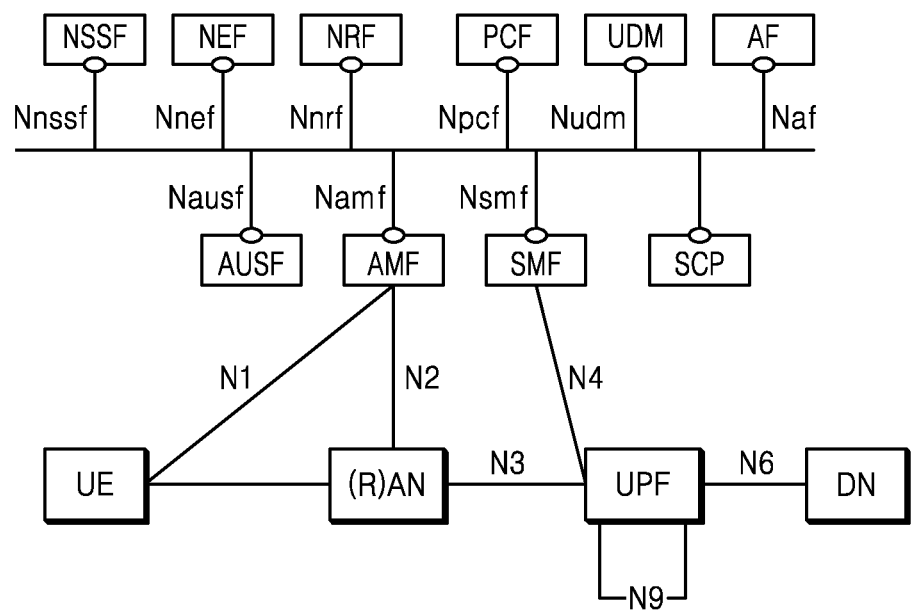
FIG. 1 is a diagram illustrating a $5^{th}$ generation (5G) system structure according to an embodiment of the present disclosure.

Terms used in the present disclosure are used only to describe a specific embodiment, and may not be intended to limit the scope of other embodiments. An expression used in the singular may encompass the expression in the plural, unless it has a clearly different meaning in the context. Terms used herein, including technical or scientific terms, may have the same meaning as commonly understood by one of ordinary skill in the art described in the present disclosure. Among terms used in the present disclosure, terms defined in a general dictionary may be interpreted as having the same or similar meanings as those in the context of the related technology, and unless explicitly defined in the present disclosure, the terms are not interpreted in ideal or excessively formal meanings. In some cases, even terms defined in the present disclosure cannot be interpreted to exclude embodiments of the present disclosure.

In various embodiments of the present disclosure described below, a hardware approach is described as an example. However, because various embodiments of the present disclosure include technology using both hardware and software, various embodiments of the present disclosure do not exclude a software-based approach. For example, embodiments of the present disclosure may be applied even when one network function (NF) is implemented in a software form instead of a hardware form, is virtualized, or operates in a cloud.

The present disclosure hereinbelow relates to a method and apparatus for supporting various services in a wireless communication system. In detail, the present disclosure describes a technology for effectively supporting various services, when one terminal includes a plurality of pieces of subscription information, in a wireless communication system. The one terminal including the plurality of pieces subscription information is implemented by the one terminal including two or more subscriber identity modules (SIMs) storing subscription information, and each SIM may be embedded in a physical card (for example, a universal integrated circuit card (UICC)), implemented in a software form, or implemented in a combination thereof. Thus, while describing embodiments of the present disclosure, subscription information and an SIM may be used in a same meaning.

The SIM denotes an access control module for accessing a network of a mobile network operator. When the SIM is used by being embedded into the terminal, the SIM is a universal SIM (USIM). Also, the UICC including the USIM may also be generally referred to as a USIM card. Similarly, the UICC including the SIM may also be generally referred to as a SIM card. In addition, the terminal may download and select the SIM by using the UICC card. In the present disclosure, for convenience of description, modules providing an access control function for accessing the network of the mobile network operator will be collectively referred to as the SIM.

Also, terms for identifying access nodes, terms denoting network entities or NFs, terms denoting messages, terms denoting an interface between network entities, terms denoting various types of identification information, etc. used herein are exemplified for convenience of description. Thus, the terms used in the present disclosure are not limited and other terms denoting targets having the same technical meanings may be used.

Hereinafter, for convenience of description, the present disclosure uses terms and names defined by the $3^{rd}$ generation partnership project long term evolution (3GPP LTE) and $5^{th}$ generation (5G) standard. However, the present disclosure is not limited by such terms and names, and may be equally applied to systems conforming to other standards.

FIG. 1 is a diagram of a structure of a 5G system, according to an embodiment of the present disclosure.

Referring to FIG. 1, an access and mobility management function (AMF) is an NF managing a wireless network access and mobility regarding a terminal (user equipment (UE)). A session management function (SMF) is an NF managing a session regarding the terminal, and session information includes quality of service (QoS) information, charging information, and information about packet processing. A user plane function (UPF) is an NF processing user plane traffic, and may be controlled by the SMF. Although not shown in FIG. 1, the 5G system may include an unstructured data storage network function (UDSF), wherein the UDSF is an NF storing unstructured data and may store or retrieve any type of data according to a request of an NF.

Also, referring to FIG. 1, a network slice selection function (NSSF) for network slice selection, a network exposure/repository function (NEF/NRF) providing information of an NF, a policy control function (PCF) for policy control, a user data management (UDM) for user data management, an application function (AF) for application control, an authentication server function (AUSF) related to authentication of a terminal, a service communication proxy (SCP) related to a communication service, and a data network (DN) for data transmission are illustrated.

Figure 2:
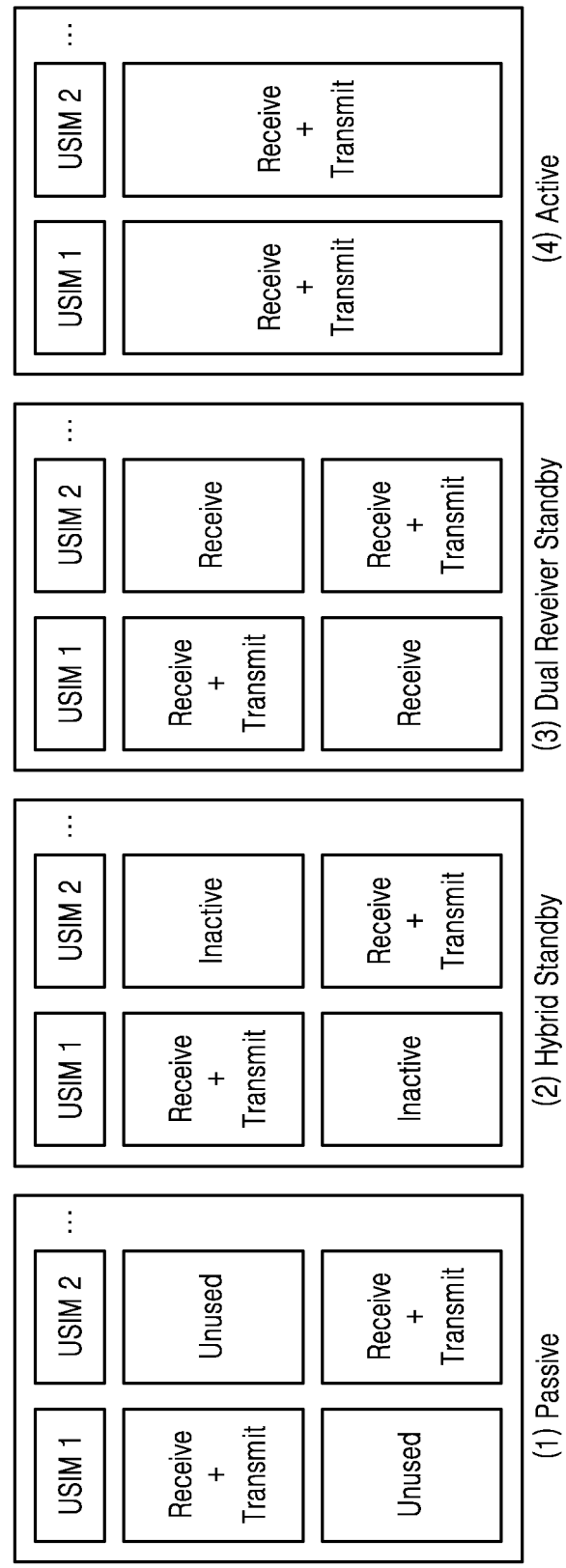
FIG. 2 is a diagram for describing a method by which one terminal processes a plurality of pieces of subscription information, according to an embodiment of the present disclosure.

FIG. 2 is a diagram for describing a method by which one terminal processes a plurality of pieces of subscription information, according to an embodiment of the present disclosure.

According to an embodiment of the present disclosure, a case where one terminal uses two or more pieces of subscription information may be supported, but for convenience of description, a case where two pieces of subscription information are used will be described. In other words, it is obvious that methods described below may be applied to cases where two or more pieces of subscription information are used.

Referring to FIG. 2, in a case of (1) passive, only one SIM may be allowed to be used at a time from among two SIMs. In other words, only one SIM is used from among the two SIMs, according to information stored in the terminal or a user configuration, and when another SIM is selected, an existing SIM is not used.

Also, referring to FIG. 2, in a case of (2) hybrid standby, two SIMs may be both used, but a communication operation may be applied to one SIM at a time, and the other SIM without a communication operation may be inactive. Inactiveness may indicate that a registration or attach procedure or authentication procedure is performed for communication with a network by using an SIM, but transmission/reception regarding user plane traffic is not performed. In a case of (3) dual receiver standby of FIG. 2, transmission and reception may both be performed for one of two SIMs, and only reception may be simultaneously performed for the other SIM. In a case of (4) active of FIG. 2, two SIMs may both simultaneously transmit and receive.

The present disclosure relates to (2) hybrid standby and (3) dual receiver standby, wherein two SIMs are simultaneously registered to a network and thus maintain communicable states. In detail, a terminal may transmit and receive only by using one SIM at a time ((2) hybrid standby), or may transmit and receive only by using one SIM at a time and simultaneously receive by using the other SIM ((3) dual receiver standby). Meanwhile, in the cases of (2) and (3) described above, following situations may occur when terminals access a network and communicate.

1) When traffic occurs regarding an SIM (second SIM) while data is transmitted or received to or from another SIM (first SIM), QoS may deteriorate because the second SIM is unable to transmit or receive traffic.

2) When paging occurs in an SIM while data is transmitted or received to or from another SIM, QoS may deteriorate and resources may be wasted because the other SIM is unable to receives the paging or transmit a response to the paging.

3) When traffic occurs in a second SIM while data is transmitted or received to or from a first SIM, and traffic transmission/reception regarding the first SIM is to be stopped to process the traffic in the second SIM, QoS may deteriorate.

Figure 3:
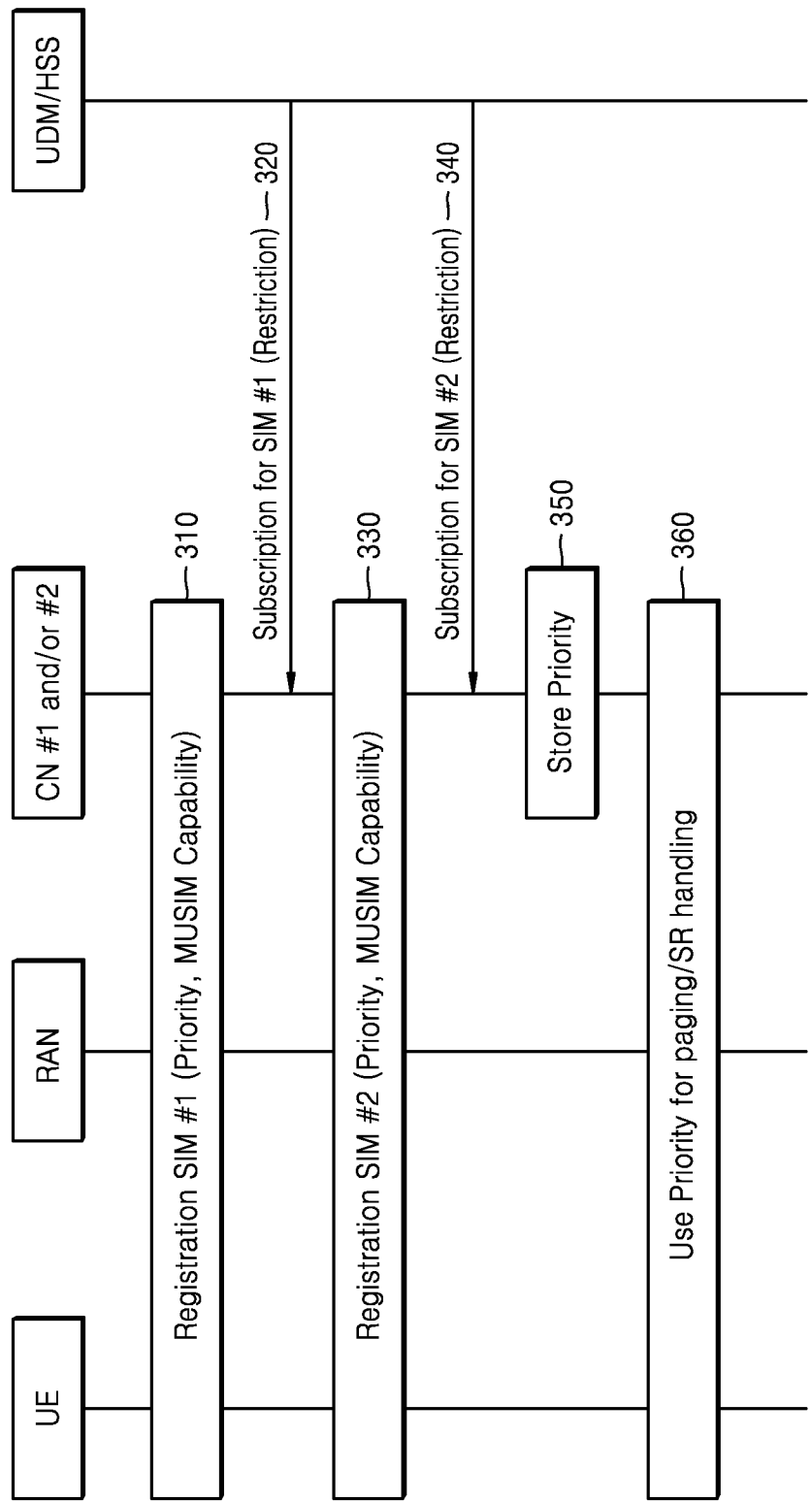
FIG. 3 is a flowchart for describing a method by which a plurality of subscriber identity modules (SIMs) process traffic, according to an embodiment of the present disclosure.

FIG. 3 is a flowchart for describing a method by which a plurality of SIMs process traffic, according to an embodiment of the present disclosure.

In operation 310, a terminal (UE) may perform a registration or attach process on a network by using a first SIM. An order or priorities between SIMs may be determined by using a user configuration, a configuration for each SIM, or information stored in the terminal. A registration or attach request message transmitted by the terminal may include information (multiple SIM (MUSIM) capability indication) indicating that the terminal has capability of supporting multiple SIMs, and may include a priority of a SIM used for current registration from among several SIMs.

In operation 320, a core network, in particular an NF (in 5G, AMF and in 4G, a mobility management entity (MME)) supporting registration and mobility management regarding the terminal, processes a registration request received in operation 310 from the terminal, and receives subscription information regarding an SIM requested to be registered, from an NF (in 5G, UDM and in 4G, a home subscriber server (HSS)). The subscription information may include information about whether a multiple SIM operation is accepted for a corresponding subscriber, and when the multiple SIM operation is accepted, may include information about an SIM accessible simultaneously with a corresponding SIM. Also, the subscription information may include an access priority regarding the corresponding SIM. The AMF or MME may process the registration request regarding the corresponding terminal and SIM, by using the subscription information and registration request of the terminal. At this time, the access priority regarding the corresponding SIM may be determined, and to determine the access priority regarding the corresponding SIM, at least one of an access priority received from the terminal and an access priority included in the subscription information may be considered. Although not illustrated in FIG. 3, the AMF or MME may transmit, to the terminal, information about whether the multiple SIM operation is supported in the network or whether the multiple SIM operation is accepted regarding the terminal, by adding the information to a registration or attach accept message. Also, the access priority determined regarding the corresponding SIM may be included in the registration accept message.

In operation 330, the terminal may perform the registration or attach process on the network by using a second SIM. The second SIM refers to an SIM different from the first SIM, and the order or priorities between the SIMs may be determined by using the user configuration, the configuration for each SIM, or the information stored in the terminal. The registration or attach request message transmitted by the terminal may include the information (MUSIM capability indication) indicating that the terminal has capability of supporting the multiple SIMs, and may include the priority of the SIM used for current registration from among several SIMs. Also, when transmitting a registration request regarding the second SIM, the terminal may include a temporary identity (in 5G, 5G-globally unique temporary identification (GUTI) and in 4G, GUTI) assigned for the first SIM registered in operations 310 and 320.

The core network, in particular, the NF (in 5G, AMF and in 4G, MME) supporting the registration and mobility management regarding the terminal, may process the registration request received in operation 330 from the terminal. Services and paging processes regarding the first SIM and second SIM may be coordinated only when a core network NF (AMF or MME) that processed registration regarding the first SIM and a core network NF that processed registration regarding the second SIM are the same. Also, the terminal may provide information when the registration request regarding the second SIM is performed, such that the same NF is selected for the first SIM and the second SIM. Here, the terminal may transmit an identity regarding a core network NF while configuring a connection (radio resource control (RRC) connection) with a base station, or the terminal may perform re-direction when the core network NF needs to be changed, by using the temporary identity regarding the first SIM transmitted to the core network NF during the registration process.

In operation 340, the core network NF may receive subscription information regarding the SIM requested to be registered, from the NF (in 5G, UDM and in 4G, HSS) storing the subscription information. The subscription information may include the information about whether the multiple SIM operation is accepted for the corresponding subscriber, and when the multiple SIM operation is accepted regarding the corresponding SIM, may include the information about the SIM accessible simultaneously with the corresponding SIM. Also, the subscription information may include the access priority regarding the corresponding SIM. The AMF or MME may process the registration request regarding the SIM and terminal by using the subscription information and the request of the terminal. Here, the access priority regarding the corresponding SIM may be determined, and one or more of the access priority received from the terminal or the access priority included in the subscription information may be considered. Although not illustrated in FIG. 3, the AMF or MME may transmit, to the terminal, the information about whether the multiple SIM operation is supported in the network or whether the multiple SIM operation is accepted regarding the terminal, by adding the information to the registration or attach accept message. Also, information about the number of SIMs simultaneously registered in a current network may be transmitted to the terminal by adding the information to the registration accept message. Also, the access priority determined regarding the corresponding SIM may be included in the registration accept message.

In operation 350, the core network NF may store priority information regarding the corresponding SIM, from the received subscription information. The terminal and network include information indicating that two or more SIMs have been registered in the network, and may identify the access priority for each SIM. Then, in operation 360, when traffic or signaling occurs, the terminal and the network may process the traffic or signaling, in consideration of the access priority for each SIM and an operation state (active/inactive or RRC connection/idle state, and the like) for each SIM. For example, when traffic occurs and paging needs to be processed regarding the second SIM while data is transmitted/received regarding the first SIM, paging transmission of the second SIM may stand by until data transmission of the first SIM is completed when a priority of the second SIM that is to transmit paging is low. Alternatively, when the priority of the second SIM that is to transmit the paging is high, the data transmission of the first SIM may be stopped (RRC release) and the second SIM may first transmit the paging. For convenience of description, the priorities between the first SIM and the second SIM have been described, but operations of the first SIM and the second SIM are not limited to the above examples and it is obvious that the above operations may be performed for two or more SIMs. Also, it is obvious that the terminal and network may perform the above operations, in consideration of the priorities not only for the paging, but also for a scheduling request (SR).

Figure 4:
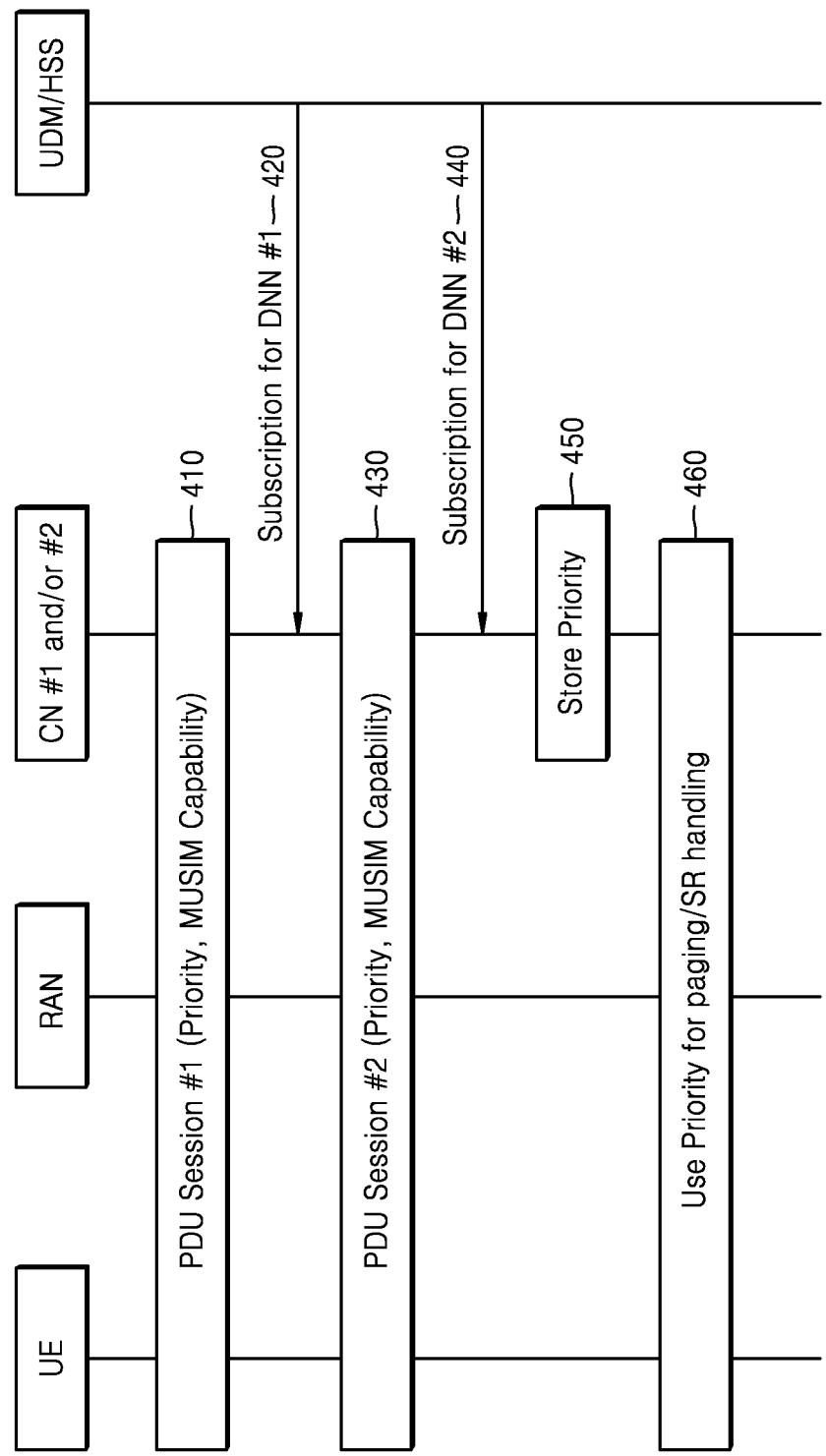
FIG. 4 is a diagram for describing a method of determining priorities between a plurality of SIMs during generation of a protocol data unit (PDU) session, according to an embodiment of the present disclosure.

FIG. 4 is a diagram for describing a method of determining priorities between a plurality of SIMs during generation of a protocol data unit (PDU) session, according to an embodiment of the present disclosure.

Referring to FIG. 4, the priorities are not determined during a process of performing registration for each SIM, but the priorities between the plurality of SIMs may be determined during a process of generating a PDU session (or public data network (PDN) connection).

In operation 410, a terminal (UE) may transmit a session (PDU session or PDN connection) generation request to a network, by using a first SIM. Here, an order or priorities regarding sessions to be generated may be determined by using a user configuration, a data network name (DNN), a configuration for each SIM, or information stored in the terminal. A session generation request message transmitted by the terminal may include information (MUSIM capability indication) indicating that the terminal has capability of supporting multiple SIMs, and may include an access priority of a target DNN (in a 4G network, access point name (APN)) and an access priority of a session being currently requested.

In operation 420, a core network, in detail, an NF (in 5G, SMF and in 4G, MME) supporting session management regarding the terminal may process a registration request received from the terminal, and when subscription information is to be received while processing the registration request, receive subscription information regarding an SIM from an NF (in 5G, UDM and in 4G, HSS). The subscription information regarding the SIM may include information about whether a multiple SIM operation is accepted for a corresponding subscriber, and when the multiple SIM operation is accepted, may include information about an SIM accessible simultaneously with a corresponding SIM. Also, the subscription information regarding the SIM may include an access priority regarding the corresponding SIM or session. The SMF or MME may process a corresponding session generation process by using the subscription information and the request of the terminal. Here, the access priority regarding the session may be determined, and to determine the access priority regarding the session, one or more of an access priority received from the terminal, an access priority of a subscriber (SIM) included in the subscription information, and an access priority of a session (DNN/APN) included in the subscription information may be considered. Although not illustrated in FIG. 4, the SMF or MME may transmit, to the terminal, a session generation accept message including information about whether the multiple SIM operation is supported in the network or whether the multiple SIM operation is accepted regarding the terminal. Also, the access priority determined regarding the corresponding session may be included in the session generation accept message. Also, the SMF or MME may transmit the above-described information to another NF (AMF or UPF when SMF, or a server gateway (SGW) when MME).

In operation 430, the terminal may transmit a session (PDU session or PDN connection) generation request to the network, by using a second SIM. Here, an order or priorities of sessions to be generated may be determined by using the user configuration, the DNN, the configuration for each SIM, or the information stored in the terminal. Also, information of the session requested in operation 430 (target DNN/APN) may be configured to be different from information used in operations 410 and 420. The session generation request message transmitted by the terminal may include the information (MUSIM capability indication) indicating that the terminal has the capability of supporting the multiple SIMs, and may include the access priority of the target DNN and the access priority of the session being currently requested.

In operation 440, the core network, in detail, the NF (in 5G, SMF and in 4G, MME) supporting session management regarding the terminal may process the registration request received from the terminal, and when the subscription information is to be received while processing the registration request, receive the subscription information regarding the SIM from the NF (in 5G, UDM and in 4G, HSS) storing the subscription information. The subscription information regarding the SIM may include the information about whether the multiple SIM operation is accepted for the corresponding subscriber, and when the multiple SIM operation is accepted, may include the information about the SIM accessible simultaneously with the corresponding SIM. Also, the subscription information regarding the SIM may include the access priority regarding the corresponding SIM or session. The SMF or MME may process the corresponding session generation process by using the subscription information and the request of the terminal. During this process, the access priority regarding the corresponding session is determined, and at this time, one or more of the access priority received from the terminal, the access priority of the subscriber (SIM) included in the subscription information, and the access priority of the session (DNN/APN) included in the subscription information may be considered. Although not illustrated in FIG. 4, the SMF or MME may transmit, to the terminal, information about whether the multiple SIM operation is supported in the network or whether the multiple SIM operation is accepted for the terminal, by including the information to the session accept message. Also, the access priority determined regarding the corresponding session may be included in the session generation accept message. Also, the SMF or MMF may transmit the above-described information to another NF (AMF or UPF when SMF, or a server gateway (SGW) when MME).

In operation 450, the terminal and network include information indicating that two or more SIMs have been registered in the network, and may identify the access priority for each session. In operation 460, when traffic or signaling occurs, the terminal and the network may process the traffic or signaling, in consideration of the access priority for each session and an operation state (active/inactive or RRC connection/idle state, and the like) for each session for each SIM. For example, when traffic occurs and paging needs to be processed regarding the second SIM while data is transmitted/received regarding a session of the first SIM, paging transmission may stand by until data transmission of the first SIM is completed when a priority of a session for transmitting the paging is lower than priorities of sessions of the first SIM. Alternatively, when the priority of the session for transmitting the paging is high, the data transmission of the first SIM may be stopped (RRC release) and the second SIM may first transmit the paging.

Meanwhile, a priority of each SIM or session may be set in a following order. A small value indicates a high priority and relative priorities may be indicated.
1) SIM or session for emergency service or emergency call (for example, DNN/APN for emergency service)
2) SIM or session for voice or image call service (for example, DNN/APM for Internet protocol (IP) multimedia subsystem (IMS))
3) SIM or session for other general data services (for example, DNN/APN for Internet)

When one terminal uses two or more SIMs, the SIMs may be registered to different radio access technologies (RATs), for example, one SIM may be registered to 5G and the other SIM may be registered to 4G. According to an embodiment of the present disclosure, a plurality of SIMs may be processed in following situations. A user configures one SIM to operate in 5G and the other SIM to operate in 4G.

One SIM transits to a 4G network according to a wireless state

Figure 5:
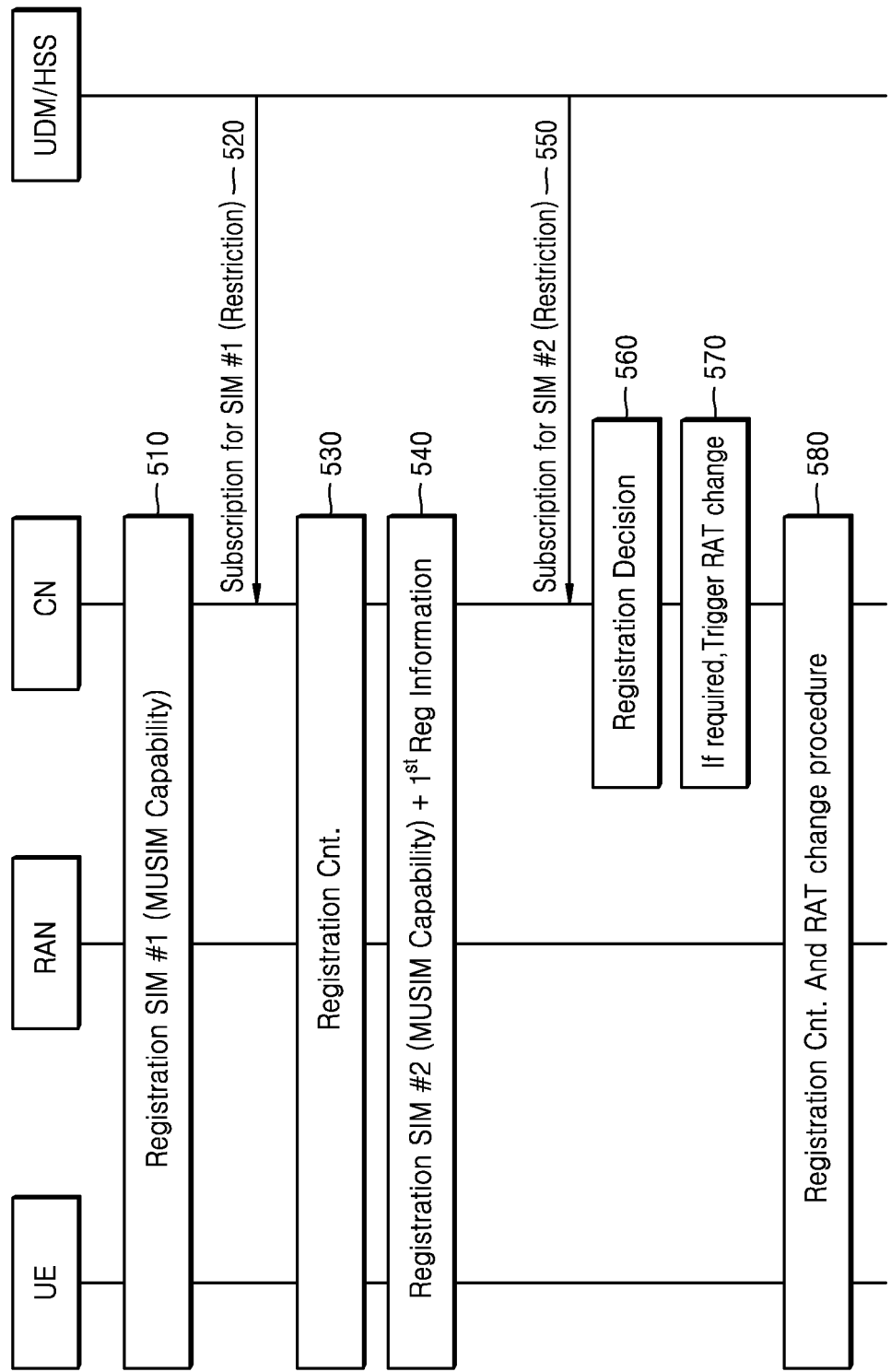
FIG. 5 is a diagram for describing a control method for a terminal, according to an embodiment of the present disclosure.

One SIM transits to a 4G network (fallback) according to a situation of a service FIG. 5 is a diagram for describing a control method for a terminal (UE), according to an embodiment of the present disclosure.

In operation 510, the terminal may perform a registration or attach process on a network by using a first SIM. An order or priorities between SIMs may be determined by using a user configuration, a configuration for each SIM, or information stored in the terminal. A registration or attach request message transmitted by the terminal may include information (MUSIM capability indication) indicating that the terminal has capability of supporting multiple SIMs, and may include a priority of a SIM used for current registration from among several SIMs.

In operation 520, a core network, in detail, an NF (in 5G, SMF and in 4G, MME) supporting registration and mobility management regarding the terminal may process a registration request received from the terminal in operation 510, and receive subscription information regarding an SIM requested to be registered during this process, from an NF (in 5G, UDM and in 4G, HSS) storing the subscription information.

The subscription information may include information about whether a multiple SIM operation is accepted for a corresponding subscriber, and when the multiple SIM operation is accepted, may include information about an SIM accessible simultaneously with a corresponding SIM. Also, the subscription information may include an access priority regarding the corresponding SIM. Also, the subscription information regarding the SIM requested to be registered may include information about whether the corresponding SIM is allowed to access a wireless network (5G, 4G, 3G, or the like) or a core network (5G core (5GC) or evolved packet core (EPC)). The AMF or MME may process the registration request regarding the SIM and terminal by using the subscription information and the request of the terminal. The access priority regarding the corresponding SIM may be determined while processing the registration request, and at this time, one or more of the access priority received from the terminal or the access priority included in the subscription information may be considered. Although not illustrated in FIG. 5, the AMF or MME may transmit, to the terminal, a registration or attach accept message including the information about whether the multiple SIM operation is supported in the network or whether the multiple SIM operation is accepted regarding the terminal. Also, the access priority determined regarding the corresponding SIM may be included in the registration accept message. Also, the registration accept message may include information about the wireless network (5G, 4G, 3G, or the like) or the core network (5GC or EPC) available to a subscriber (i.e., a subscriber indicated by the corresponding SIM) to be registered to the terminal.

A remaining process (operation 530) among a procedure for registering the first SIM is performed, and in operation 540, the terminal may perform a registration or attach process on the network by using a second SIM. The second SIM refers to an SIM different from an SIM used in operation 1 (the first SIM), and the order or priorities between the SIMs may be determined by using the user configuration, the configuration for each SIM, or the information stored in the terminal. A registration or attach request message transmitted by the terminal may include information (MUSIM capability indication) indicating that the terminal has capability of supporting multiple SIMs, and may include a priority of a SIM used for current registration from among several SIMs. Also, when transmitting a registration request regarding the second SIM, the terminal may include a temporary identity (in 5G, 5G-GUTI and in 4G, GUTI) assigned for the first SIM registered in operations 510 and 520.

In operation 540, the core network, in particular, the NF (in 5G, AMF and in 4G, MME) supporting the registration and mobility management regarding the terminal, may process the registration request received from the terminal.

Services and paging processes regarding the first SIM and second SIM may be coordinated only when a core network NF (AMF or MME) that processes registration regarding the first SIM and a core network NF that processes registration regarding the second SIM are the same, and the terminal may provide information during the registration request regarding the second SIM such that a same NF is selected for the first SIM and second SIM. Here, the terminal may transmit an identity regarding a core network NF while configuring a connection (radio resource control (RRC) connection) with a base station, or the terminal may perform re-direction when the core network NF needs to be changed, by using the temporary identity regarding the first SIM transmitted to the core network NF during the registration process.

In operation 550, the core network NF may receive the subscription information regarding the SIM requested to be registered, from the NF (in 5G, UDM and in 4G, HSS) storing the subscription information. The subscription information may include the information about whether the multiple SIM operation is accepted for the corresponding subscriber, and when the multiple SIM operation is accepted regarding the corresponding SIM, may include the information about the SIM accessible simultaneously with the corresponding SIM. Also, the subscription information may include an access priority regarding the corresponding SIM. Also, the subscription information may include information about whether access of the corresponding SIM to the wireless network (5G, 4G, 3G, or the like) or the core network (5GC or EPC) is allowed.

In operation 560, the AMF or MME may process the registration request regarding the SIM and terminal by using the subscription information and the request of the terminal. During this process, the access priority regarding the corresponding SIM may be determined, and one or more of the access priority received from the terminal or the access priority included in the subscription information may be considered. When determining whether registration regarding the terminal is accepted or whether to re-direct the terminal to a wireless network and core network allowed to the terminal or to another wireless network or NF, the AMF or MME may consider whether the registration request of the terminal is generated for two or more SIMs regarding one terminal. When the terminal registers to two or more SIMs, the AMF or MME processes the terminal to be registered to one core network if possible, and this is to increase quality of service or performance by processing the registration, mobility and paging management regarding the terminal, by one AMF or MME.

In operation 570, when the wireless network or core network, on which the terminal performed the current registration request, needs to be changed, the AMF or MME may change the wireless network or core network during the registration process so as to trigger the second SIM to access the same wireless network or core network as the first SIM. Although not illustrated in FIG. 5, during this process, the AMF or MME may transmit, to the terminal, the information about whether the multiple SIM operation is supported in the network or whether the multiple SIM operation is accepted regarding the terminal, by adding the information to the registration or attach accept message. Also, information about the number of SIMs simultaneously registered in a current network may be transmitted to the terminal by adding the information to the registration accept message. Also, the access priority determined regarding the corresponding SIM may be included in the registration accept message. The registration accept message may include information about the wireless network (5G, 4G, 3G, or the like) or the core network (5GC or EPC) available to the terminal regarding the registration.

In operation 580, the terminal and network include information indicating that two or more SIMs have been registered in the network, and may identify the access priority for each SIM. Also, the two SIMs of the terminal may be registered in and managed by a same core network NF (AMF or MME). Then, when traffic or signaling occurs, the terminal and the network may process the traffic or signaling, in consideration of the access priority for each SIM and an operation state (active/inactive or RRC connection/idle state, and the like) for each SIM. For example, when traffic occurs and paging needs to be processed regarding the second SIM while data is transmitted/received regarding the first SIM, paging transmission of the second SIM may stand by until data transmission of the first SIM is completed when a priority of the second SIM that is to transmit paging is low. Alternatively, when the priority of the second SIM that is to transmit the paging is high, the data transmission of the first SIM may be stopped (RRC release) and the paging may be first transmitted.

Figure 6:
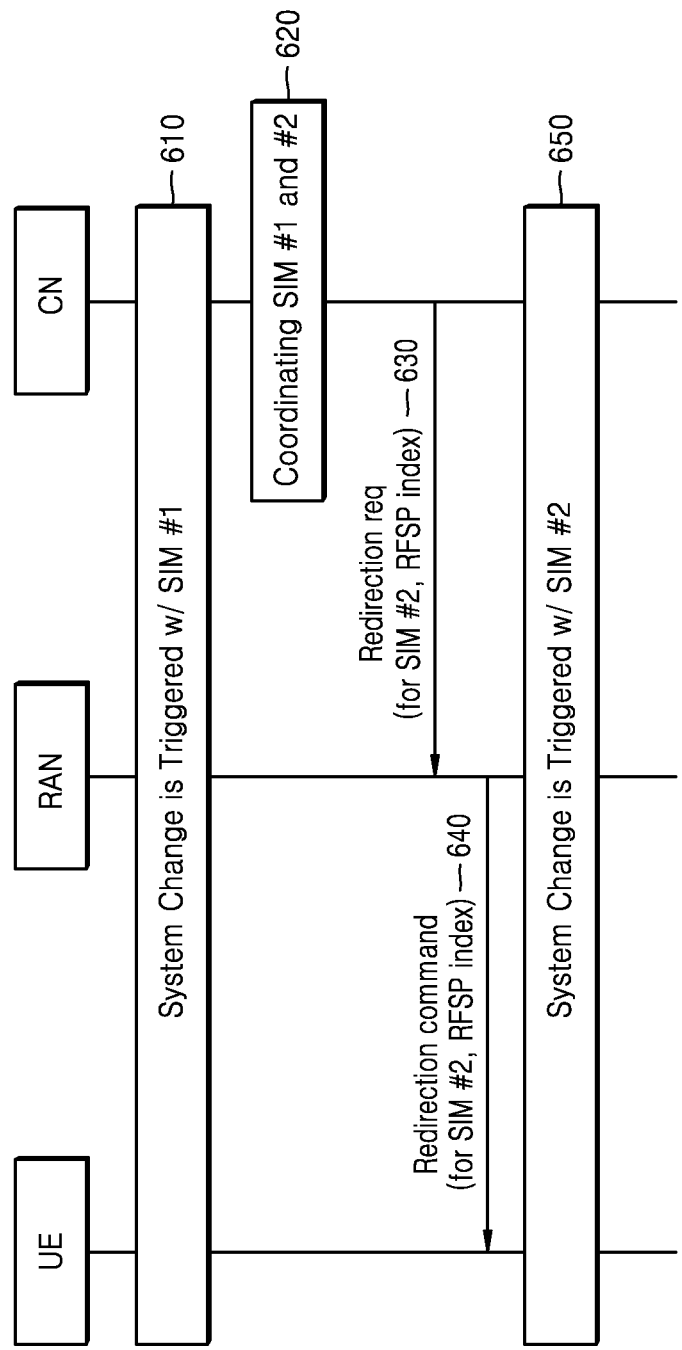
FIG. 6 is a diagram for describing an SIM control method of a terminal, according to an embodiment of the present disclosure.

FIG. 6 is a diagram for describing an SIM control method of a terminal (UE), according to an embodiment of the present disclosure.

In operation 610, while two SIMs of the terminal are registered to a same core network and receiving a service, a situation, in which one SIM may be switched to another core network, may occur. This situation may occur during a control process according to a wireless network state or a specific service type (fallback or the like for voice/emergency call).

In operation 620, an AMF or MME may determine whether a change in a system (core network) of the other SIM is required as one SIM access system (core network) is changed. Here, the AMF or MME may consider a priority of each SIM or a session generated in each SIM.

In operation 630, when it is required to manage a second SIM in a same system (core network) as a first SIM, the AMF or MME may trigger a process for changing a system to which the second SIM of the terminal has been registered. Here, an RRC connection regarding the terminal is disconnected while transmitting a command inducing re-direction to a base station and the terminal, and an access priority (radio access type/frequency of selection priority, radio frequency selection priority (RFSP) index) regarding the terminal is adjusted.

Meanwhile, the AMF or MME that controls the terminal in operations 620 and 630 may be an AMF or MME to which the terminal has been registered.

In operation 640, the second SIM of the terminal may also perform a process for receiving a service by being registered in the same system (core network) as the first SIM. This may correspond to a mobility update registration or tracking area update process.

Figure 7:
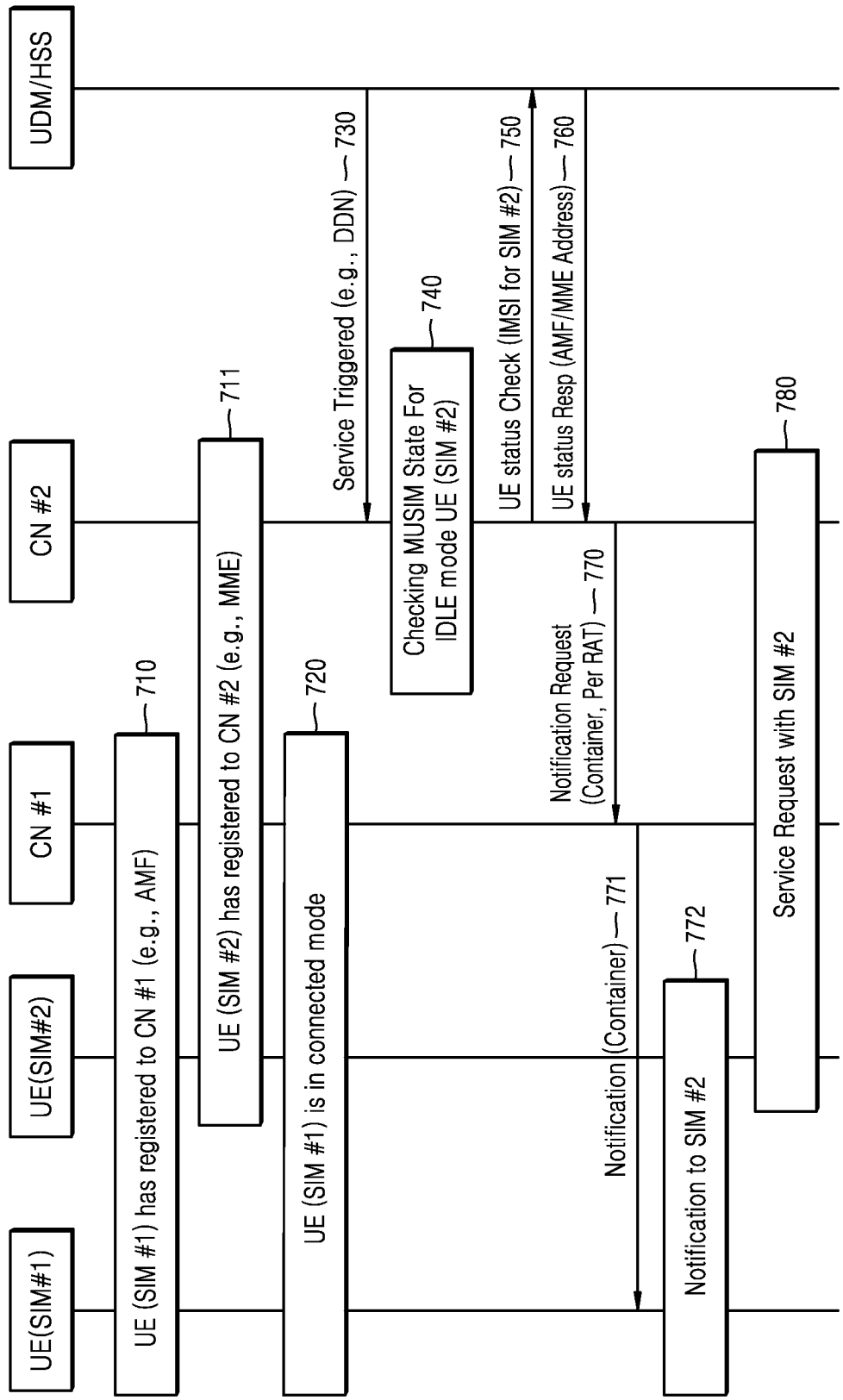
FIG. 7 is a diagram for describing a method of controlling a service in a situation where a plurality of SIMs are managed by different systems, according to an embodiment of the present disclosure.

FIG. 7 is a diagram for describing a method of controlling a service in a situation where a plurality of SIMs are managed by different systems, according to an embodiment of the present disclosure.

In detail, FIG. 7 is a diagram for describing a method of controlling a service in a situation where the plurality of SIMs have been registered to a network by using one terminal (UE), but the plurality of SIMs are managed by different systems (core networks).

In operation 710, a first SIM of the terminal may be registered to a system. For convenience of description, it is assumed that the first SIM has been registered to a core network NF 1 (for example, AMF).

In operation 711, a second SIM of the terminal may be registered to another system. For convenience of description, it is assumed that the second SIM has been registered to a core network NF 2 (for example, MME). It is assumed that the two core networks are aware that the terminal operates in two SIMs.

In operation 720, the first SIM of the terminal may be in a connected state to transmit/receive traffic.

In operation 730, downlink data may occur to a session of the second SIM of the terminal or a situation where signaling is required may occur.

In operation 740, the core network NF 2 may determine that a state of the terminal is in an idle state, but the terminal is operating in two or more SIMs.

In operation 750, to determine whether the first SIM of the terminal is currently communicating, the core network NF 2 may inquire UDM or HSS for information of a core network NF to which the first SIM of the terminal has been registered.

In operation 760, the UDM or HSS may transmit a name, address, or identifier of an IP address or the like of the NF to which the first SIM of the terminal has been registered, i.e., AMF or MME.

In operation 770, the core network NF 2 may identify the core network NF 1 to which the first SIM of the terminal has been registered by using the received information, and request the core network NF 1 to transmit information indicating that a service has occurred regarding the terminal. Here, in determining whether to transmit the information and a point of time to transmit the information, the core network may consider each SIM and a service priority of each SIM. Also, a message transmitted by the core network NF 2 may include an entire paging message, instead of a simple service occurrence notification.

In operation 771, the core network NF 1 may transmit, by using the received information, an alarm indicating that a service has occurred regarding the second SIM, to the terminal (i.e., the first SIM) being currently accessed. The alarm or paging transmitted to the terminal may include a service type or a priority for each service.

In operation 772, according to implementation or an internal structure of the terminal, service alarm information received by the first SIM may be transmitted to a controller processing the second SIM. Here, the controller may determine regarding which SIM transmission/reception is to be first processed for each service regarding the first SIM and the second SIM, and may consider priority information received in operation 771.

In operation 780, the terminal may recognize occurrence of the service regarding the second SIM of the terminal, and perform an operation for resuming the service.

Figure 8:
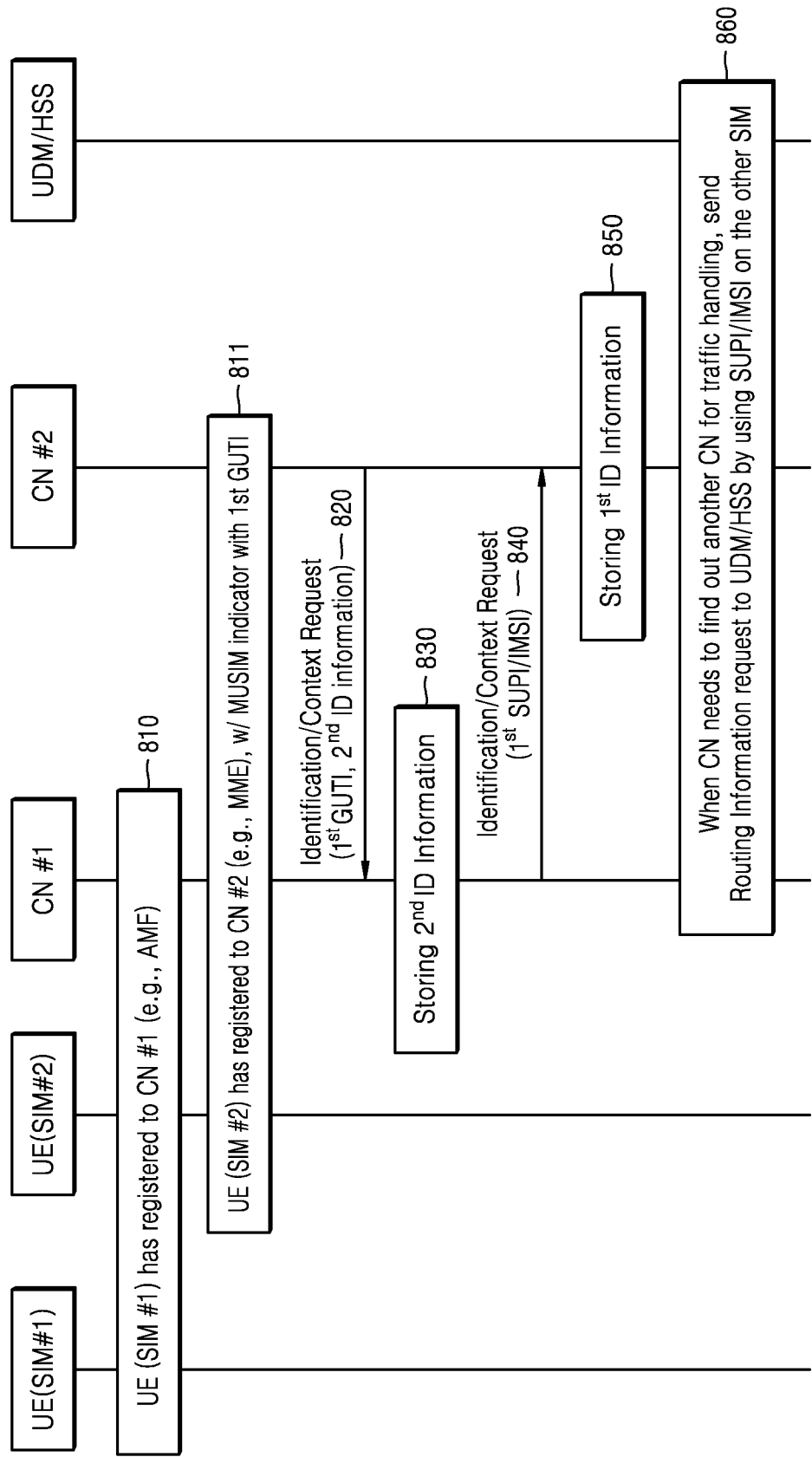
FIG. 8 is a diagram for describing a method of searching for a system to which an SIM of a terminal has been registered, according to an embodiment of the present disclosure.

FIG. 8 is a diagram for describing a method of searching for a system to which an SIM of a terminal (UE) has been registered, according to an embodiment of the present disclosure.

In operation 810, a first SIM of the terminal may be registered to a system. For convenience of description, it is assumed that the first SIM has been registered to a core network NF 1 (for example, AMF).

In operation 811, a second SIM of the terminal may be registered to another system. For convenience of description, it is assumed that the second SIM has been registered to a core network NF 2 (for example, MME). When transmitting a registration request message (registration/attach or tracking area update request), the terminal may add, to the registration request message, information (MUSIM capability indication) indicating that the terminal has capability of supporting multiple SIMs, and a temporary identity (5G-GUTI or GUTI) assigned when another SIM is registered.

In operation 820, the core network NF 2 may determine that the terminal operates in a plurality of SIMs during a process of processing a registration request of the terminal, and identify a core network NF (in the current embodiment, the core network NF 1) to which the first SIM has been registered, by using the temporary identity received during the registration request. The core network NF 2 needs to identify a subscription identity (subscriber permanent identifier (SUPI) or international mobile subscriber identity (IMSI)) of the first SIM of the terminal to find an NF to which the first SIM has been registered, for future traffic, service, and paging processing. As described above, the subscription identity of the first SIM may be determined by inquiring UDM or HSS for information about an NF to which another SIM of the terminal has been registered. The UDM or HSS may store corresponding information based on the subscription identity. The core network NF 2 may transmit, to the identified core network NF (in the current embodiment, the core network NF 1), a message (identification or context request) requesting the subscription identity of the first SIM of the terminal. This message may include the temporary identity of the other SIM, which has been received from the terminal. Also, the message may include the subscription identity of the second SIM of the terminal to be registered to pre-notify the same to the core network NF 2. In addition, the message may include an indication indicating that the identity/information request is for processing multiple SIMs in one terminal, instead of mobility management.

In operation 830, the core network NF 1 may process the received request message. The core network NF 1 may search UE context corresponding to the temporary identity of the terminal included in the request message for the subscription identity. When the request message includes second SIM information of the same terminal registered to the core network NF 2, the second SIM information may be stored as another SIM information for a multiple SIM operation of the terminal.

In operation 840, the core network NF 1 may transmit, to the core network NF 2, the subscription identity (SUPI or IMSI) of the first SIM (registered to the core network NF 1) of the terminal. A message used at this time may be an indication or context response message. Unlike a general identification response or context response generated during mobility management, the identification or context response message is for transmitting the subscription identity, and context regarding the terminal may not be deleted because a service regarding the registered terminal needs to be provided even after the response.

In operation 850, the core network NF 2 may store information of the first SIM of the same terminal received from the core network NF 1, as the other SIM information for the multiple SIM operation regarding the terminal.

In operation 860, the core network NFs may verify the subscription identity of the other SIM regarding the terminal registered thereto. When another core network NF to which the other SIM has been registered needs to be found for traffic processing, paging processing or the like, the core network NF may transmit, to UDM/HSS, a request for obtaining an identity, name, and address of the other core network NF to which the SIM has been registered, by using the stored subscription identity of the other SIM.

Meanwhile, according to another embodiment of the present disclosure, when the core network NF to which the other SIM has been registered is changed, each core network NF may perform subscription for receiving a notification on information about the change and information (identity, name, address, or the like) of the core network NF after the change. The subscription may be performed by the core network NF via UDM/HSS by using a subscription identity regarding a specific SIM, and when a core network NF to which the specific SIM has been registered is changed, the UDM/HSS may transmit the notification to the core network NF that subscribed to such information.

Also, the subscription may be directly and mutually performed between the core network NFs. In this case, when the core network NF is changed (for example, when the terminal was registered to an AMF #1 and then the registration is changed to an AMF #2 due to mobility or the like), and the MME subscribed to a core network NF change alarm, the AMF #1 or AMF #2 may notify the MME that the registration regarding the terminal is changed to the AMF #2.

Figure 9:
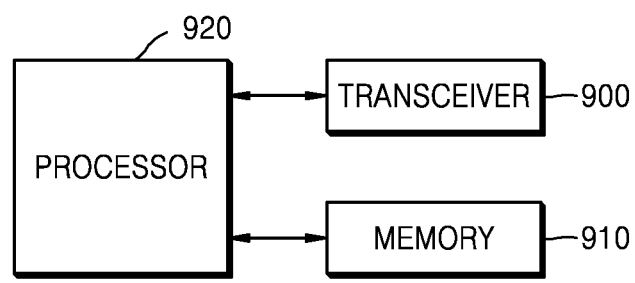
FIG. 9 is a diagram showing a configuration of a network entity, according to an embodiment of the present disclosure.

As shown in FIG. 9, a network entity of the present disclosure may include a transceiver 900, a memory 910, and a processor 920. The network entity may be NSSF, NEF, NRF, PCF, UDM, AF, AUSF, AMF, SMF, SCP, (R)AN, UPF, or DN described in FIG. 1, but for convenience of description, NSSF, NEF, NRF, PCF, UDM, AF, AUSF, AMF, SMF, SCP, (R)AN, UPF, and DN may be collectively referred to as the network entity. In other words, each of network entities may include the transceiver 900, the memory 910, and the processor 920. The processor 920, the transceiver 900, and the memory 910 of the network entity may operate according to a communication method of the network entity described above. However, the components of the network entity are not limited thereto. For example, the network entity may include more or fewer components than those described above. In addition, the processor 920, the transceiver 900, and the memory 910 may be implemented in a form of one chip. Also, the processor 920 may include one or more processors.

The transceiver 900 collectively refers to a receiver and a transmitter of the network entity, and may transmit/receive a signal to/from a base station. The signal transmitted or received to or from the base station may include control information and data. In this regard, the transceiver 900 may include a RF transmitter for up-converting and amplifying a frequency of a transmitted signal, and a RF receiver for amplifying low-noise and down-converting a frequency of a received signal. However, this is only an example of the transceiver 900 and components of the transceiver 900 are not limited to the RF transmitter and the RF receiver. Also, the transceiver 900 may transmit/receive a signal to/from other network entities.

Also, the transceiver 900 may receive and output, to the processor 920, a signal through a radio channel, and transmit a signal output from the processor 920 through the radio channel.

The memory 910 may store a program and data required for operations of the network entity. Also, the memory 910 may store control information or data included in a signal obtained by the network entity. The memory 910 may be a storage medium, such as read-only memory (ROM), random-access memory (RAM), a hard disk, a CD-ROM, and a DVD, or a combination of storage media.

The processor 920 may control a series of processes such that the network entity operates as according to an embodiment of the present disclosure described above. For example, the processor 920 may receive a control signal and a data signal via the transceiver 900 and process the received control signal and data signal. Also, the processor 920 may transmit the processed control signal and data signal to via the transceiver 900.

The transceiver 900, the memory 910, and the processor 920 may be electrically connected to each other. Also, for example, the processor 920 may be a circuit, an application-specific circuit, or at least one processor. Also, operations of the network entity may be implemented by providing a memory device storing corresponding program code to an arbitrary configuration in the network entity.

Also, the network entity may be any one of a base station (RAN), AMF, SMF, UPF, NF, NEF, NRF, CF, NSSF, UDM, AF, AUSF, SCP, UDSF, context storage, OAM, EMS, configuration server, and ID management server. However, the network entity is not limited to the above examples.

Figure 10:
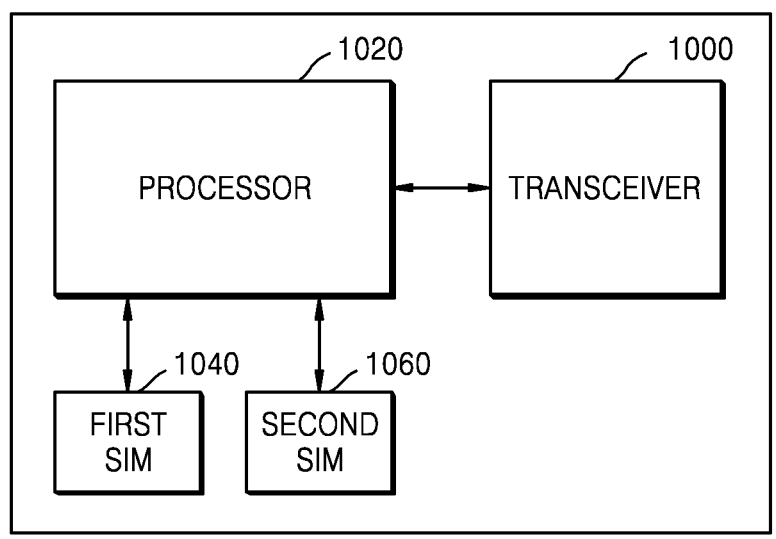
FIG. 10 is a diagram showing a configuration of a terminal, according to an embodiment of the present disclosure.

FIG. 10 is a diagram showing a configuration of a terminal (UE), according to the present disclosure.

As shown in FIG. 10, the terminal of the present disclosure may include a transceiver 1000, a processor 1020, a first SIM 1040, and a second SIM 1060. The processor 1020, the transceiver 1000, the first SIM 1040, and the second SIM 1060 of the terminal may operate according to a communication of the terminal described above. However, the components of the terminal are not limited thereto. For example, the terminal may include more or fewer components than those described above. For example, referring to FIG. 10, only the first SIM 1040 and the second SIM 1060 are illustrated, but the present disclosure is not limited thereto, and the terminal may further include N SIMs. In addition, the processor 1020 and the transceiver 1000 may be implemented in a form of one chip. Also, the processor 1020 may include one or more processors.

The transceiver 1000 collectively refers to a receiver and a transmitter of the terminal, and may transmit/receive a signal to/from a base station. The signal transmitted or received to or from the base station may include control information and data. In this regard, the transceiver 1000 may include a RF transmitter for up-converting and amplifying a frequency of a transmitted signal, and a RF receiver for amplifying low-noise and down-converting a frequency of a received signal. However, this is only an example of the transceiver 1000 and components of the transceiver 1000 are not limited to the RF transmitter and the RF receiver.

Also, the transceiver 1000 may receive and output, to the processor 1020, a signal through a radio channel, and transmit a signal output from the processor 1020 through the radio channel.

The processor 1020 may control a series of processes such that the terminal operates as according to an embodiment of the present disclosure described above. For example, the processor 1020 may receive a control signal and a data signal via the transceiver 1000 and process the received control signal and data signal. Also, the processor 1020 may transmit the processed control signal and data signal to via the transceiver 1000.

The first SIM 1040 and the second SIM 1060 may be access control modules for accessing a network of a mobile network operator. The processor 1020 may perform a registration process on a certain network entity, by using the first SIM 1040. Also, the processor 1020 may perform a registration process on the network entity, by using the second SIM 1060.

The processor 1020 may use information related to the first SIM 1040 during the registration process regarding the second SIM 1060, such that a same NF is selected for the first SIM 1040 and the second SIM 1060. For example, when the registration process of the first SIM 1040 is performed first, the processor 1020 may perform the registration process of the second SIM 1060, based on an identity assigned regarding the first SIM 1040.

Also, the processor 1020 may store priority information regarding the first SIM 1040 and the second SIM 1060, based on subscription information received from the network entity. Also, the processor 1020 may perform operations of the first SIM 1040 and second SIM 1060, based on the priority information. For example, the processor 1020 may control data transmission of the first SIM 1040 and paging of the second SIM 1060, based on a priority.

Figure 11:
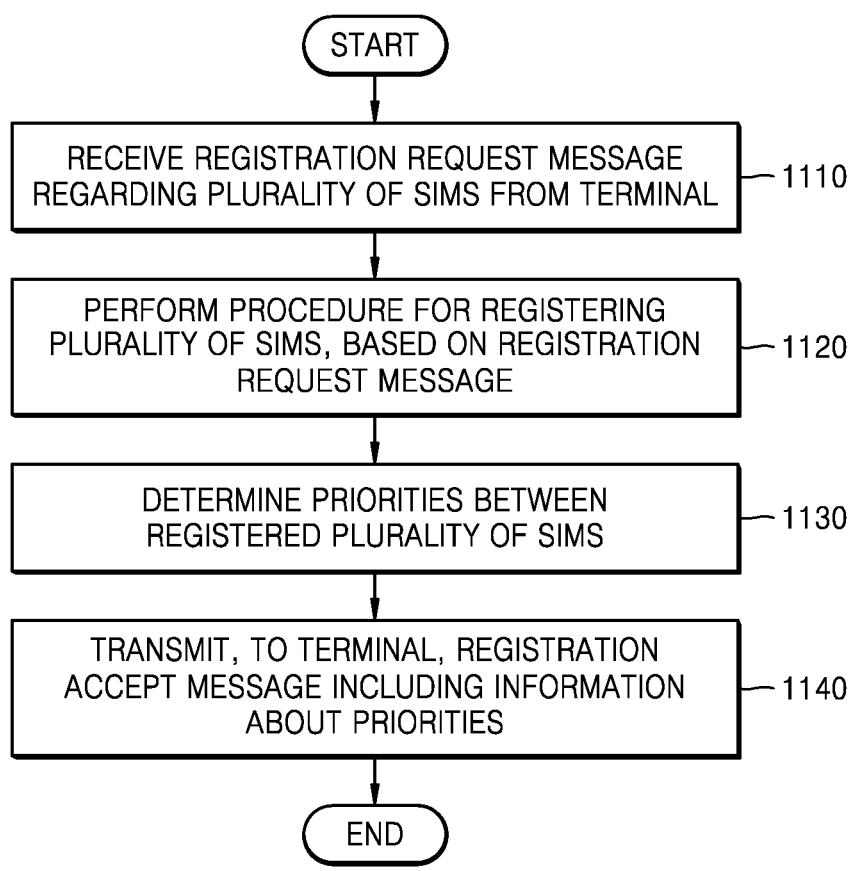
FIG. 11 is a flowchart for describing an operation method of a network entity, according to an embodiment of the present disclosure.

FIG. 11 is a flowchart for describing an operation method of a network entity, according to an embodiment of the present disclosure.

In operation 1110, the network entity may receive a registration request message regarding a plurality of SIMs, from a terminal. According to an embodiment of the present disclosure, the network entity may be MME that is a core network of 4G or AMF that is a core network of 5G. Also, the network entity may receive a first registration request message regarding a first SIM from among the plurality of SIMs, and receive a second registration request message regarding a second SIM. In operation 1120, the network entity may perform a procedure for registering the plurality of SIMs, based on the registration request message. The network entity may perform the procedure for registering the first SIM, based on the first registration request message, and perform the procedure for registering the second SIM, based on the second registration request message. Here, the second registration request message may include identification information regarding the first SIM. The network entity may control the second SIM to be registered to the network entity to which the first SIM is registered, based on the identification information regarding the first SIM.

In operation 1130, the network entity may determine priorities between the registered plurality of SIMs. The network entity may determine the priorities between the plurality of SIMs, based on subscription information regarding the plurality of SIMs, received from another network entity (for example, UDM or HSS). Also, the network entity may control traffic, based on the determined priorities.

In operation 1140, the network entity may transmit, to the terminal, a registration accept message including information about the priorities. The terminal may verify the priorities regarding the plurality of SIMs, based on the registration accept message.

It should be noted that configuration diagrams, example diagrams of control/data signal transmission methods, and operation procedure example diagrams and configuration diagrams of FIGS. 1 through 11 are not intended to limit the scope of right of the present disclosure. That is, all configurations, entities, or operations described in FIGS. 1 through 11 should not be interpreted as being essential components for the implementation of the disclosure, and the embodiments of the disclosure may be implemented within the scope that does not impair the essence of the disclosure even by including only some components.

The methods according to the embodiments described in the claims or the detailed description of the present disclosure may be implemented in hardware, software, or a combination of hardware and software.

When the methods are implemented in software, a computer-readable recording medium having one or more programs (software modules) recorded thereon may be provided. The one or more programs recorded on the computer-readable recording medium are configured to be executable by one or more processors in an electronic device. The one or more programs include instructions to execute the methods according to the embodiments described in the claims or the detailed description of the present disclosure.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory including a combination of some or all of the above-mentioned memories. In addition, there may be a plurality of memories.

The programs may also be stored in an attachable storage device which is accessible through a communication network such as the Internet, an intranet, a local area network (LAN), a wide area network (WAN), or a storage area network (SAN), or a combination thereof. The storage device may be connected through an external port to an apparatus according the embodiments of the present disclosure. Another storage device on the communication network may also be connected to the apparatus performing the embodiments of the present disclosure.

In the afore-described embodiments of the present disclosure, elements included in the disclosure are expressed in a singular or plural form according to the embodiments. However, the singular or plural form is appropriately selected for convenience of explanation and the present disclosure is not limited thereto. As such, an element expressed in a plural form may also be configured as a single element, and an element expressed in a singular form may also be configured as plural elements.

Meanwhile, specific embodiments have been described in the detailed description of the present disclosure, but various modifications may be possible without departing from the scope of the present disclosure. Therefore, the scope of the present disclosure should not be limited to the embodiments described above, but should be determined not only by the scope of the following claims, but also by the equivalents of the claims.

The invention claimed is:

1. A method performed by a terminal in a wireless communication system, the method comprising:
    transmitting, to a network entity, a first message including information indicating that the terminal is capable of supporting multiple subscriber identity modules (MUSIMs) and information associated with a service priority with respect to a subscriber identity module (SIM) for a current registration among a plurality of SIMs; and
    receiving, from the network entity, a second message indicating whether the MUSIMs are supported in the network entity,
    wherein the network entity is an access and mobility management function (AMF) or a mobility management entity (MME), and
    wherein the information associated with the service priority indicates an Internet protocol (IP) multimedia subsystem (IMS) voice service is prioritized over other services.

2. The method of claim 1, further comprising:
    releasing a radio resource control (RRC) connection associated with a first SIM, in case that a paging associated with a second SIM needs to be processed.

3. The method of claim 1, further comprising:
receiving, from the network entity, information on a service type,
wherein the service type includes a voice service.

4. The method of claim 1, further comprising:
processing a paging for the SIM included in the MUSIMs based on a priority of the paging.

5. The method of claim 4, wherein processing the paging comprises identifying that a paging for an IMS service is prioritized over a paging for other data services.

6. A terminal in a wireless communication system, the terminal comprising:
a transceiver; and
at least one processor coupled with the transceiver and configured to:
transmit, to a network entity, a first message including information indicating that the terminal is capable of supporting multiple subscriber identity modules (MUSIMs) and information associated with a service priority with respect to a subscriber identity module (SIM) for a current registration among a plurality of SIMs; and
receive, from the network entity, a second message indicating whether the MUSIMs are supported in the network entity,
wherein the network entity is an access and mobility management function (AMF) or a Mobility Management Entity (MME), and
wherein the information associated with the service priority indicates an Internet protocol (IP) multimedia subsystem (IMS) voice service is prioritized over other services.

7. The terminal of claim 6,
wherein the at least one processor is further configured to:
release a radio resource control (RRC) connection associated with a first SIM, in case that paging associated with a second SIM needs to be processed.

8. The terminal of claim 6,
wherein the at least one processor is further configured to:
receive, from the network entity, information on a service type,
wherein the service type includes a voice service.

9. The terminal of claim 6,
wherein the at least one processor is further configured to:
process a paging for the SIM included in the MUSIMs based on a priority of the paging.

10. The terminal of claim 9,
wherein the at least one processor is further configured to:
identify that a paging for an IMS service is prioritized over a paging for other data services.

11. A method performed by a network entity in a wireless communication system, the method comprising:
receiving, from a terminal, a first message including information indicating that the terminal is capable of supporting multiple subscriber identity modules (MUSIMs) and information associated with a service priority with respect to a subscriber identity module (SIM) for a current registration among a plurality of SIMs; and
transmitting, to the terminal, a second message indicating whether the MUSIMs are supported in the network entity,
wherein the network entity is an access and mobility management function (AMF) or a mobility management entity (MME), and
wherein the information associated with the service priority indicates an Internet protocol (IP) multimedia subsystem (IMS) voice service is prioritized over other services.

12. The method of claim 11, wherein a radio resource control (RRC) connection associated with a first SIM is released, in case that paging associated with a second SIM needs to be processed.

13. The method of claim 11, further comprising:
transmitting, to the terminal, information on a service type,
wherein the service type includes a voice service.

14. The method of claim 11, further comprising:
processing a paging for the SIM included in the MUSIMs based on a priority of the paging.

15. The method of claim 14, wherein processing the paging comprises identifying that a paging for an IMS service is prioritized over a paging for other data services.

16. A network entity in a wireless communication system, the network entity comprising:
a transceiver; and
at least one processor coupled with the transceiver and configured to:
receive, from a terminal, a first message including information indicating that the terminal is capable of supporting multiple subscriber identity modules (MUSIMs) and information associated with a service priority with respect to a subscriber identity module (SIM) for a current registration among a plurality of SIMs; and
transmit, to the network entity, a second message indicating whether the MUSIMs are supported in the network entity,
wherein the network entity is an access and mobility management function (AMF) or a mobility management entity (MME), and
wherein the information associated with the service priority indicates an Internet protocol (IP) multimedia subsystem (IMS) voice service is prioritized over other services.

17. The network entity of claim 16,
wherein a radio resource control (RRC) connection associated with a first SIM is released, in case that paging needs associated with a second SIM to be processed.

18. The network entity of claim 16,
wherein the at least one processor is further configured to transmit, to the terminal, information on a service type, and
wherein the service type includes a voice service.

19. The network entity of claim 16,
wherein the at least one processor is further configured to:
process a paging for the SIM included in the MUSIMs based on a priority of the paging.

20. The network entity of claim 19,
wherein the at least one processor is further configured to:
identify that a paging for an IMS service is prioritized over a paging for other data services.

* * * * *